(12) United States Patent
Marushita et al.

(10) Patent No.: US 8,525,461 B2
(45) Date of Patent: Sep. 3, 2013

(54) MOTOR CONTROL DEVICE

(75) Inventors: Yoshihiro Marushita, Chiyoda-ku (JP); Hidetoshi Ikeda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/697,055

(22) PCT Filed: May 19, 2011

(86) PCT No.: PCT/JP2011/061530
§ 371 (c)(1),
(2), (4) Date: Nov. 9, 2012

(87) PCT Pub. No.: WO2011/148852
PCT Pub. Date: Dec. 1, 2011

(65) Prior Publication Data
US 2013/0057194 A1 Mar. 7, 2013

(30) Foreign Application Priority Data
May 26, 2010 (JP) .................................. 2010-120372

(51) Int. Cl.
*H02P 5/00* (2006.01)
*H02P 6/14* (2006.01)

(52) U.S. Cl.
USPC ........ 318/432; 318/400.3; 318/560; 318/799; 388/800

(58) Field of Classification Search
USPC ................. 318/400.02, 400.3, 400.23, 430, 318/609, 61, 560, 561, 626, 630, 799; 388/800
See application file for complete search history.

(56) References Cited

U.S. PATENT DOCUMENTS

| | | | | | |
|---|---|---|---|---|---|
| 4,751,447 | A | * | 6/1988 | Okachi | 318/772 |
| 5,256,944 | A | * | 10/1993 | Tobise et al. | 318/799 |
| 5,547,296 | A | * | 8/1996 | Iwazawa | 400/322 |
| 5,773,938 | A | * | 6/1998 | Seong et al. | 318/6 |
| 6,184,644 | B1 | * | 2/2001 | Eguchi | 318/632 |
| 7,443,120 | B2 | * | 10/2008 | Tobari et al. | 318/400.02 |

(Continued)

FOREIGN PATENT DOCUMENTS

| | | |
|---|---|---|
| JP | 4-121086 A | 4/1992 |
| JP | 5-284774 A | 10/1993 |

(Continued)

OTHER PUBLICATIONS

International Search Report for PCT/JP2011/061530 dated Aug. 30, 2011.

*Primary Examiner* — Paul Ip
(74) *Attorney, Agent, or Firm* — Sughrue Mion, PLLC (57) ABSTRACT

There are provided a command speed calculation means (101) for outputting a command speed ($\omega r$) from a base speed ($\omega b$) and a ratio gain ($\alpha$), reference speed generation means (108) calculating a reference speed ($\omega a$) so as to follow the command speed ($\omega r$) based on the command speed ($\omega r$), control deviation calculation means (103) for outputting a control deviation (e) from a speed deviation ($\omega e$) and a speed deviation correction value ($\omega ec$), speed control means (104) for outputting a compensation torque ($\tau m$) for decreasing the control deviation (e), speed deviation correction means (105) for calculating the speed deviation correction value ($\omega ec$) from at least the compensation torque ($\tau m$), command torque calculation means (107) for outputting a command torque ($\tau r$) from at least the compensation torque ($\tau m$) and ratio calculation means (102) for calculating the ratio gain ($\alpha$) from the speed deviation ($\omega e$).

9 Claims, 5 Drawing Sheets

(56) References Cited

U.S. PATENT DOCUMENTS

| | | | |
|---|---|---|---|
| 7,733,047 B2 * | 6/2010 | Ikeda et al. | 318/432 |
| 2007/0085507 A1 * | 4/2007 | Tobari et al. | 318/710 |
| 2009/0175601 A1 * | 7/2009 | Ikeda et al. | 388/800 |
| 2012/0212169 A1 * | 8/2012 | Wu et al. | 318/432 |
| 2012/0217911 A1 * | 8/2012 | Wu et al. | 318/400.3 |

FOREIGN PATENT DOCUMENTS

| | | |
|---|---|---|
| JP | 7-81818 A | 3/1995 |
| JP | 11-241687 A | 9/1999 |
| WO | 2007/091319 A1 | 8/2007 |

* cited by examiner

MOTOR CONTROL DEVICE

CROSS REFERENCE TO RELATED APPLICATIONS

This application is a National Stage of International Application No. PCT/JP2011/061530 filed May 19, 2011, claiming priority based on Japanese Patent Application No. 2010-120372 filed May 26, 2010, the contents of all of which are incorporated herein by reference in their entirety.

TECHNICAL FIELD

The present invention relates to a motor control apparatus, and more particularly, to a motor control apparatus used as a drive device for various kinds of industrial machines such as an industrial machine for driving conveyor rolls used for conveying a material to be conveyed such as a steel plate, paper, or a film.

BACKGROUND ART

In order to convey a material to be conveyed such as a steel plate, paper, and a film, a conventional motor control apparatus drives, by means of motors, a plurality of conveyor rolls which are continuously arranged. The conventional motor control apparatus includes a speed control means. The speed control device receives, as an input, a deviation between a command speed and a motor speed, performs proportional-integral calculation to calculate a compensation torque so that the command speed and the motor speed coincide with each other, and outputs a command torque to the motor. The conventional motor control apparatus employs, in order to impart a tension to a material to be conveyed, draw control for generating a command value so that a speed difference (draw) is provided with respect to a predetermined base speed (or a predetermined reference speed). Moreover, the conventional motor control apparatus includes tension calculation means in order to control, by a simple adjustment, a tension of a material to be conveyed to coincide with a desired tension value. The tension calculation means calculates the tension of the material to be conveyed based on an acceleration/deceleration torque required by a motor for acceleration/deceleration, a mechanical torque, and a detected motor current. A draw setting for setting the speed difference is provided so that the calculated tension calculation value reaches a desired tension. After the speed difference is set so that the tension calculation value coincides with the desired tension, the tension calculation value on this occasion is held as a tension reference value. Moreover, the conventional motor control apparatus provides control, by activating tension control means for correcting the command speed, based on the tension reference value and the tension calculation value so that the tension of the material to be conveyed is maintained constant (refer to Patent Literature 1).

Moreover, another conventional motor control apparatus includes speed control means for calculating a compensation torque and adding the compensation torque to a torque command for driving a motor. The speed control means receives, as an input, a deviation between a command speed and a motor speed, and calculates a compensation torque so that the speed command and the motor speed coincide with each other by performing calculation for proportional control or proportional-integral control. Moreover, drooping control is used in order to avoid steady generation of an excessive torque, by an action of the speed control means. The drooping control is control for providing a drooping characteristic with which the motor speed decreases as the motor torque increases. In the drooping control, a speed droop amount, which is a proportional multiple of the compensation torque, is subtracted from the command speed. By the drooping control, even if there is a minute error between the command speed and a conveying speed at which a material to be conveyed is conveyed while the material is constrained by other conveyor rolls, a function of preventing, by the action of the speed control means, an excessive torque from being generated steadily is realized (for example, refer to Patent Literature 2).

CITATION LIST

Patent Literature

[PTL 1]: JP 07-81818 A
[PTL 2]: JP 04-121086 A

SUMMARY OF INVENTION

Technical Problem

However, the conventional motor control apparatus described in Patent Literature 1 has the following problems. The tension imparted to the material to be conveyed also changes depending on an expansion/contraction property and shapes such as the thickness and the width of the material to be conveyed, and a conveyor roll diameter. Therefore, even for the same desired tension value, depending on the material to be conveyed and the roll diameter, a required speed difference differs. Therefore, with the motor control apparatus described in Patent Literature 1, each time the material to be conveyed or the conveyor roll is changed, the setting for the speed difference needs to be carried out again. Moreover, the speed difference is set while the tension calculation value is being checked, and the tension calculation value when the setting of the speed difference is finished is set to the tension reference value. Then, using the tension reference value as the reference, the control is performed so that the tension becomes constant. As a result, each time the tension value imparted to the material to be conveyed is changed, the setting of the speed difference needs to be carried out again. Consequently, it is difficult for the conventional motor control apparatus to adapt to an operation in which the tension imparted to the material to be conveyed is continuously changed.

Moreover, after setting the speed difference, the motor control apparatus described in Patent Literature 1 maintains the tension reference value by switching a switch, and causes the tension control means to operate, which carries out the control based on the tension reference value and the tension calculation value. The tension of the material to be conveyed when the speed difference is set by the tension control means is controlled by the speed difference which is being set. As a result, if there is a minute setting error such as a roll diameter error, a mechanical loss torque, or a modeling error in the acceleration/deceleration torque, until the speed difference is set so that the tension of the material to be conveyed reaches the desired value, an excessive error is generated in the tension of the material to be conveyed, and there is a problem that a stable conveyance cannot be carried out.

Moreover, in the motor control apparatus according to Patent Literature 2, since the above-mentioned drooping characteristic is provided only for the speed control means inside the motor control apparatus, there is a problem, for example, that it is not easy to precisely maintain the motor torque to a value matching a desired tension.

If there is a minute error in the conveyor roll diameter for conveying, by a motor, a material to be conveyed, a steady-state error with respect to a theoretical value is often generated in the relationship between the conveying speed of a material to be conveyed, which is conveyed while being constrained by a plurality of conveyor rolls, and the motor speed. In this case, the speed control means acts so that the motor speed coincides with the speed command providing the theoretical value of the conveying speed. As a result, even if the above-mentioned drooping control is carried out, the speed control means steadily generates a large torque. As a result, there is a problem that a large error is generated with respect to a value of the tension of the material to be conveyed, which is instructed by the torque command input from the outside.

Moreover, since the speed control means is constituted so that a speed controller inside the motor control apparatus has the above-mentioned drooping characteristic, particularly when the acceleration/deceleration is carried out, a speed aligning property with respect to motors which drives other conveyor rolls decreases, and there is a problem that the tension of the material to be conveyed fluctuates significantly.

The present invention has been made in order to solve the above-mentioned problems, and therefore has an object to provide a motor control apparatus for setting, even if a material to be conveyed, a conveyor roll, or a desired tension value to be imparted to the material to be conveyed is changed, a speed difference by means of a simple adjustment while carrying out a stable conveyance, and controlling, while imparting a desired tension as set externally to the material to be conveyed, a motor and a conveying speed of the material to be conveyed precisely and stably in accordance with the command speed.

Solution to Problem

According to the present invention, there is provided a motor control apparatus, including: command speed calculation means for calculating a command speed based on a base speed input from an outside and a ratio gain; control deviation calculation means for outputting a control deviation based on a speed deviation, which is a difference between the command speed and a motor speed, which is a speed of a motor for driving a mechanical load, and a speed deviation correction value; speed control means for outputting, based on the control deviation, by means of control calculation including at least integral calculation, a compensation torque so that the control deviation decreases; speed deviation correction means for calculating the speed deviation correction value based on at least the compensation torque and inputting the speed deviation correction value to the control deviation calculation means; command torque calculation means for outputting, based on at least the compensation torque, a command torque, which is a target value of a torque of the motor for driving the mechanical load; and ratio calculation means for calculating the ratio gain based on the speed deviation and inputting the ratio gain to the command speed calculation means.

Advantageous Effects of the Invention

The present invention is directed to the motor control apparatus, including: the command speed calculation means for calculating the command speed based on the base speed input from the outside and the ratio gain; the control deviation calculation means for outputting the control deviation based on the speed deviation, which is the difference between the command speed and the motor speed, which is the speed of the motor for driving the mechanical load, and the speed deviation correction value; the speed control means for outputting, based on the control deviation, by means of the control calculation including at least the integral calculation, the compensation torque so that the control deviation decreases; the speed deviation correction means for calculating the speed deviation correction value based on at least the compensation torque and inputting the speed deviation correction value to the control deviation calculation means; the command torque calculation means for outputting, based on at least the compensation torque, the command torque, which is the target value of the torque of the motor for driving the mechanical load; and the ratio calculation means for calculating the ratio gain based on the speed deviation and inputting the ratio gain to the command speed calculation means. Thus, it is possible to set, even if the material to be conveyed, the conveyor roll, or the desired tension value to be imparted to the material to be conveyed is changed, the speed difference by means of a simple adjustment while carrying out a stable conveyance, and control, while imparting the tension as set externally to the material to be conveyed, the motor and the conveying speed of the material to be conveyed precisely and stably in accordance with the command speed.

DESCRIPTION OF EMBODIMENTS

Figure 1:
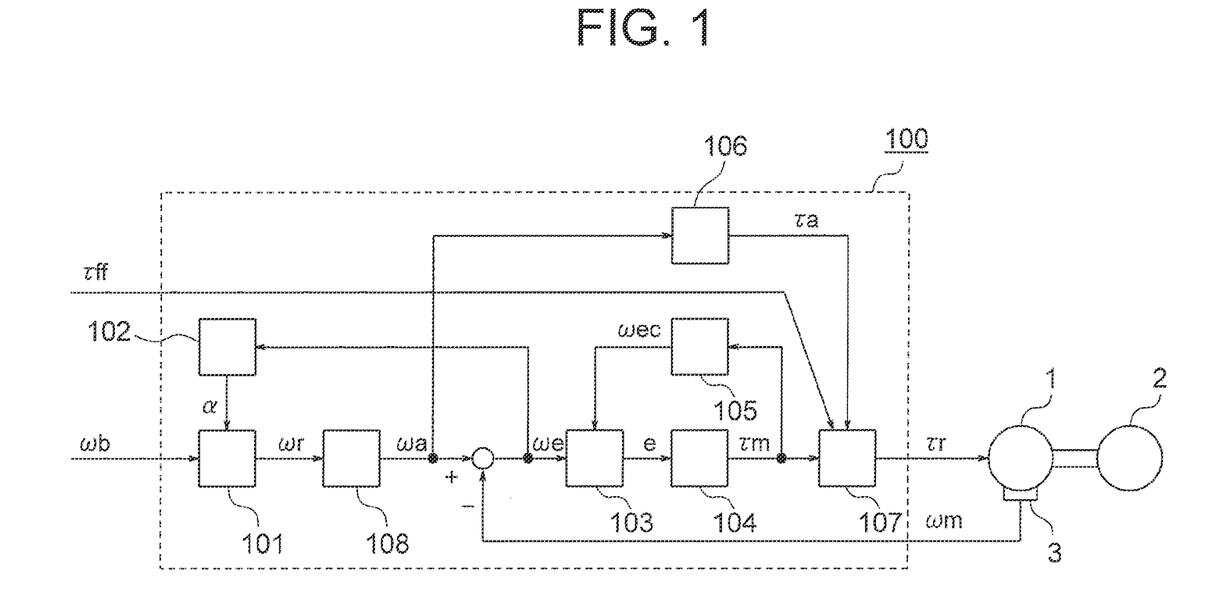
FIG. 1 A block diagram illustrating a configuration of a motor control apparatus according to a first embodiment of the present invention.

FIG. 1 is a block diagram illustrating a motor control apparatus according to a first embodiment of the present invention. In FIG. 1, reference numeral 1 denotes a motor; 2, a mechanical load; 3, speed detection means; 100, a motor control apparatus; 101, command speed calculation means; 102, ratio calculation means; 103, control deviation calculation means; 104, speed control means; 105, speed deviation correction means; 106, acceleration/deceleration torque calculation means; 107, command torque calculation means; and 108, reference speed generation means. Note that, as illustrated in FIG. 1, the motor control apparatus 100 internally includes the components 101 to 108. Moreover, the motor control apparatus 100 is connected to the motor 1 provided outside the motor control apparatus 100.

First, a description is given of an overall operation of the motor control apparatus 100. Note that, in the first embodiment of the present invention, a form of operation based on speed control is described. However, the operation is not particularly limited to the speed control, and the operation can be similarly realized by carrying out position control.

The motor control apparatus 100 receives, as inputs, a motor speed $\omega m$, which is a speed of the motor 1 detected by the speed detection means 3, a base speed ωb input from the outside, and a feed forward torque τff. Then, the motor control apparatus 100 outputs, by an operation described below, a command torque τr to the motor 1. The motor 1 generates, by actions of torque control means and electric power conversion means, which are not illustrated, a torque which coincides with the command torque τr, thereby driving the motor 1 itself and the mechanical load 2. In the specification, a conveyor system (refer to FIG. 2) is described as an example of the mechanical load 2 driven by the motors 1, however, the mechanical load 2 is not limited to the conveyor system.

Inside the motor control apparatus 100, the command speed calculation means 101 receives, as inputs, the base speed ωb input from the outside, and a ratio gain α calculated by the ratio calculation means 102 described later. The command speed calculation means 101 generates, by using the base speed ωb and the ratio gain α, a command speed ωr for controlling the motor speed ωm the of motor 1. Specifically, the command speed calculation means 101 generates, by for example carrying out an arithmetic calculation represented by the following equation (1) by using the ratio gain α, the command speed ωr so that the command speed ωr has a speed difference with respect to the base speed ωb. Note that, by thus providing the command speed ωr with the speed difference with respect to the base speed ωb, a tension can be imparted to a material to be conveyed, which is conveyed by the mechanical load 2.

$$\omega r = (1+\alpha)\omega b \quad (1)$$

The reference speed generation means 108 receives the command speed ωr as an input, and calculates a reference speed ωa based on for example first-order lag calculation so that the reference speed ωa follows the command speed ωr.

The control deviation calculation means 103 receives, as inputs, the speed deviation ωe, which is a difference between the reference speed ωa and the motor speed ωm, and a speed deviation correction value ωec, which output by the speed deviation correction means 105 described later, and outputs a control deviation e based on calculation represented by the following equation (2).

$$e = \omega e - \omega ec \quad (2)$$

The speed control means 104 receives, as an input, the control deviation e, and carries out calculation, for example, as represented by the following equation (3), so as to reduce the control deviation e, by means of an proportional-integral calculation using a speed proportional gain Kvp and a speed integral gain Kvi, and outputs a result thereof as a compensation torque τm. Note that, in the following equation (3), s denotes a Laplacian operator.

$$\tau m = (kvp \cdot s + Kvi)/s \cdot e \quad (3)$$

The speed deviation correction means 105 receives, as an input, the compensation torque τm, and outputs the speed deviation correction value ωec based on the compensation torque τm, by applying predetermined control calculation. As an example of the predetermined control calculation, the compensation torque τm may be multiplied by a predetermined gain, and the multiplication result may be used as the speed deviation correction value ωec.

On the other hand, the acceleration/deceleration torque calculation means 106 receives, as an input, the reference speed ωa output by the command speed calculation means 101, calculates, corresponding to a change in the reference speed ωa, a torque required for accelerating/decelerating the motor 1 and the mechanical load 2 coupled to the motor 1, and outputs the torque as an acceleration/deceleration torque τa.

The calculation of the acceleration/deceleration torque τa is carried out by a method of, for example, calculating a reference acceleration ωa', which is a differentiated signal of the reference speed ωa, and multiplying the calculated reference acceleration ωa' by a moment of inertia of the motor 1 and a moment of inertia of the mechanical load 2.

The command torque calculation means 107 receives, as inputs, the feed forward torque τff input from the outside, the compensation torque τm output from the speed control means 104, and the acceleration/deceleration torque τa output from the acceleration/deceleration torque calculation means 106, and outputs, as the command torque τr, a sum of the feed forward torque τff, the compensation torque τm, and the acceleration/deceleration torque τa.

Moreover, the ratio calculation means 102 receives, as an input, the speed deviation ωe, which is a difference between the command speed ωr and the motor speed ωm, calculates the ratio gain α by applying such control calculation as to reduce the speed deviation ωe, to thereby output the ratio gain α. As a result, the command speed calculation means 101 changes the base speed ωb, based on the ratio gain α calculated by the ratio calculation means 102, by the calculation represented by the equation (1), and outputs the command speed ωr.

Figure 2:
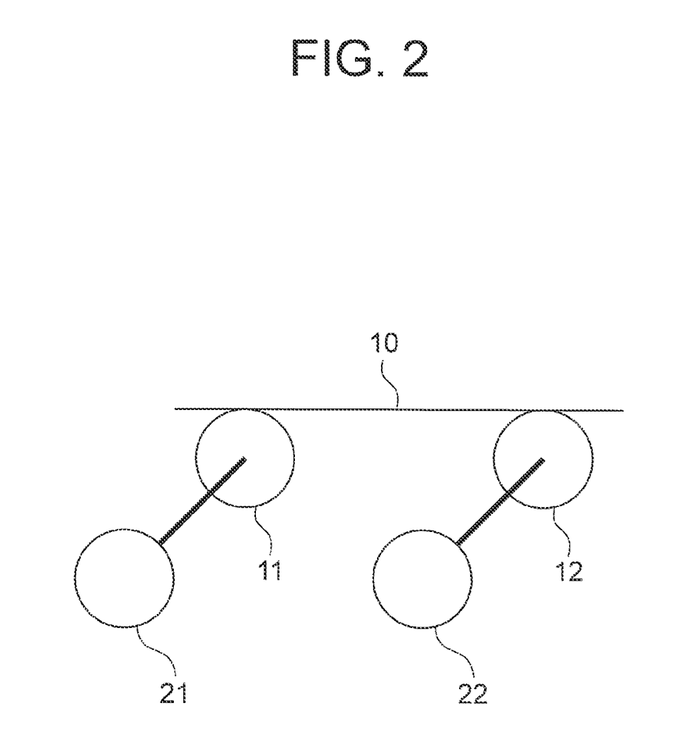
FIG. 2 A configuration diagram illustrating a configuration of a conveyor system which is an application example of the motor control apparatus according to the first embodiment of the present invention.

FIG. 2 illustrates a configuration example of the conveyor system using the motor control apparatus according to the present invention. In FIG. 2, reference numeral 10 denotes a material to be conveyed such as a steel plate, paper, and a film; 11, a first roll; 12, a second roll; 21, a first motor; and 22, a second motor. So as to simplify the description, it is assumed that a transfer characteristic from the input to the output of the reference speed generation means 108 is 1, and thus, ωa=ωr and ωa'=ωr' (ωr': command acceleration).

The conveyor system illustrated in FIG. 2 rotationally drives, in the same direction, the first roll 11 and the second roll 12 respectively by the first motor 21 and the second motor 22, thereby conveying the material to be conveyed 10. In this conveyor system, it is desired that, while a desired tension is imparted to the material to be conveyed 10, by carrying out acceleration/deceleration for the desired conveying speed, the material to be conveyed 10 be conveyed. The motor control apparatus described in the first embodiment of the present invention is, for example, used to drive the first motor 21 illustrated in FIG. 2, and, on this occasion, for the second motor 22, speed control or position control generally used may be employed.

A description is now given of a detailed operation of the motor control apparatus 100 and effects acquired therefrom. As described above, the feed forward torque τff is input from the outside into the motor control apparatus 100. The feed forward torque τff, as a torque required for imparting the tension to the material to be conveyed 10, is externally calculated in advance. Moreover, more precisely, a value obtained by calculating or previously measuring a mechanical loss such as frictions in the motor 1 and the mechanical load 2 may be set to the feed forward torque τff.

First, a case where the speed control means 104 is omitted and the compensation torque τm output by the speed control means 104 is thus set to 0 is first considered. In this case, the command torque τr is acquired by adding the feed forward torque τff and the acceleration/deceleration torque τa by the command torque calculation means 107. Then, based on the command torque τr, the motor 1 is operated. When the calculation of the feed forward torque τff and the acceleration/deceleration torque τr is precise and there is no external disturbance factor such as a friction variation, the motor 1 and the mechanical load 2 can be accelerated/decelerated while the desired tension is being imparted to the material to be conveyed. Accordingly, the speed and the tension of the material to be conveyed can be controlled as desired.

However, in practice, when the motor 1 is driven by the command torque τr generated by the feed forward torque τff and the acceleration/deceleration torque τa, the motor speed ωm fluctuates. This is caused by various external disturbances such as a pulsation generated by the motor 1, a pulsation in the speed caused by a mechanical eccentricity of the mechanical load 2, a fluctuation in the mechanical loss such as friction, and an error in consideration of a transient component in the calculation of the acceleration/deceleration torque τa. Therefore, with respect to the command torque τr generated by the feed forward torque τff and the acceleration/deceleration torque τa, there is a problem that the material to be conveyed cannot be stably conveyed.

A description is now given of characteristics and effects of the speed control means 104 provided to the motor control apparatus 100 according to the present invention.

The speed control means 104 provides an effect of restraining the fluctuation of the motor speed ωm, which is generated by the influences of the external disturbances described above. Moreover, consideration is given to a case where, in the conveyor system illustrated in FIG. 2, both the first motor 21 and the second motor 22 are driven by means of the speed control, namely, a case where the speed deviation correction means 105 is omitted. In this case, the tension is imparted to the material to be conveyed by generating the command speed to be given to the first motor 21 so that a slight speed difference is generated between a predetermined reference speed, for example, a command speed given to a motor for controlling the conveying speed (the motor is first motor 21 in the conveyor system illustrated in FIG. 2) and a command speed given to another motor for driving the neighboring conveyor roll (the motor is second motor 22 in the conveyor system illustrated in FIG. 2). In this way, when both the first motor 21 and the second motor 22 are driven by the speed control without the speed deviation correction means 105, the tension imparted to the material to be conveyed is determined only by the difference in speed between the first motor 21 and the second motor 22. Accordingly, even if the feed forward torque τff is input from the outside so that the tension of the material to be conveyed is the desired value, a control so that the tension coincides with the desired value cannot be provided.

However, a physical relationship between the speed difference and the tension imparted to the material to be conveyed is not clear. Therefore, in order to provide control so that the tension imparted to the material to be conveyed reaches the desired value, adjustment of the speed difference in a trial-and-error manner is required. However, in the conveyor system illustrated in FIG. 2, even a slight error in setting of the speed difference easily causes instability. Therefore, adjusting the speed difference so that the tension imparted to the material to be conveyed becomes the desired value is an extremely delicate and difficult operation. Moreover, in the conveyor system illustrated in FIG. 2, the conveyor roll diameter has a minute error from a designed value. Moreover, when the tension changes before and after the conveyor roll, an expansion and a contraction of the material to be conveyed causes a change in the conveying speed of the material to be conveyed before and after the conveyor roll. Those factors also cause, even if the motor speeds of the motor 21 and the motor 22 are controlled exactly based on the command speeds, an error in the conveying speed of the material to be conveyed with respect to the desired value. In this case, when the speed control is carried out so that the motor speed coincides with the command speed, an error is generated between the command speed input to the motor and the conveying speed of the material to be conveyed, which is conveyed while the material to be conveyed is constrained by a plurality of conveyor rolls. As a result, the tension imparted to the material to be conveyed has an excessive error. When the command speed given to the motor is larger than the conveying speed of the material to be conveyed, the tension imparted to the material to be conveyed decreases, and the material to be conveyed is loosened. Conversely, when the command speed given to the motor is smaller than the conveying speed of the material to be conveyed, an excessive tension is applied to the material to be conveyed, and an excessive motor torque which matches the excessive tension is generated.

The conventional motor control apparatus described in Patent Literature 1 includes the tension calculation means in order to easily set the speed difference. The tension calculation means calculates the tension imparted to the material to be conveyed, from a mechanical torque, a detected current value of the motor, and an acceleration/deceleration torque, which is calculated from a moment of inertia of a conveyor roll and the command speed. Then, while the tension calculated value calculated by the tension calculation means is being checked, the speed difference is set so that the tension imparted to the material to be conveyed is optimal. In this way, by setting the speed difference while the tension calculated value is being checked, the desired tension can be imparted to the material to be conveyed.

In this way, in the conventional motor control apparatus described in Patent Literature 1, the speed difference is set while the tension calculated value is being checked. Therefore, each time the set value of the tension imparted to the material to be conveyed is changed, it is necessary to reset the speed difference depending on the tension set value. Therefore, the conventional motor control apparatus described in Patent Literature 1 cannot be applied to a conveyor system which changes the tension set value in a stepwise or continuous manner during an operation. Moreover, when the dimension and material of the material to be conveyed or the distance between the conveyor rolls is changed, even for the same tension set value, the required speed difference changes. Moreover, as described above, the conveyor roll diameter has the minute error from the design value, and the minute error is different from one conveyor roll to another. Therefore, even if the material to be conveyed or the conveyor roll is changed, the speed difference depending on the tension set value has to be reset each time. It is conceivable to consider the dimensions and the materials of the materials to be conveyed, to calculate, in advance, speed differences required for the tension set value, and to store the speed differences as a table function in the motor control apparatus. However, it is not realistic to consider all conditions such as the materials, the dimensions of the materials to be conveyed, the minute errors of the conveyor rolls, and an arrangement of the conveyor rolls.

Further, in the conventional motor control apparatus described in Patent Literature 1, while the tension calculated value calculated by the tension calculation means is being checked, the speed difference is set so that the tension imparted to the material to be conveyed becomes the desired value. As described above, the setting of the speed difference for controlling the tension imparted to the material to be conveyed requires the delicate setting, and hence the adjustment tends to be performed in the trial-and-error manner, and a slight setting error causes the instability of the conveyor system. Therefore, the conventional motor control apparatus described in Patent Literature 1 has a problem in that the conveyor system becomes unstable during a setting period in which the speed difference changes from an initial setting to a more or less appropriate setting.

A description is now given of characteristics and effects of the speed deviation correction means 105 provided to the motor control apparatus 100 according to the present invention. The motor control apparatus 100 according to the present invention includes the speed deviation correction means 105. The speed deviation correction means 105 outputs, as the speed deviation correction value ωec, the product of the predetermined gain and the compensation torque τm, which is the output of the speed control means 104 for carrying out the calculation such as the proportional-integral calculation. Then, the control deviation calculation means 103 carries out the control of subtracting the speed deviation correction value ωec output by the speed deviation correction means 105 from the speed deviation ωe. As a result, even if there is a steady-state minute speed error, generation of an excessive tension error or an excessive motor torque can be prevented.

In FIG. 1, the configuration in which the speed deviation correction value ωec is subtracted from the speed deviation ωe is illustrated. However, a configuration in which, in place of the speed deviation ωe, the speed deviation correction value ωec is subtracted from the command speed ωr can provide the same effect. In other words, the configuration in FIG. 1 is equivalent to a configuration in which a deviation between the motor speed ωm and the signal acquired by subtracting the speed deviation correction value ωec from the command speed ωr is input to the speed control means 104. As a result of this control, by making a modification so that the command speed ωr decreases as the compensation torque τm increases, there is provided an effect of preventing the compensation torque τm from increasing excessively.

Consideration is given to a case where the calculation carried out by the speed control means 104 is a proportional-integral calculation represented by the equation (3) and the speed deviation correction means 105 carries out a proportional calculation using a proportional gain K. On this occasion, a transfer function from the speed deviation ωe to the compensation torque τm is represented by the following equation (4).

$$\tau m/\omega e = (Kvp \cdot s + Kvi)/(1 + k \cdot Kvp)s + K \cdot Kvi) \quad (4)$$

In the equation (4), when K is set to 0, the equation (4) is the same as the equation (3), and this configuration is equivalent to a case where the speed deviation correction means 105 is omitted. On this occasion, when s is set to 0, a steady-state gain of the equation (4) is infinite. When the speed deviation ωe has a steady-state minute value, calculation for generating an infinite compensation torque τm is carried out, thereby causing the speed deviation ωe to asymptotically approach zero. On the other hand, when the speed deviation correction means 105 is used, the steady-state gain of the equation (4) is 1/K, and hence even if there is a steady-state speed deviation ωe, the compensation torque τm output by the speed control means 104 is finite. Accordingly, the motor torque is prevented from becoming excessively large.

However, when the steady-state speed deviation ωe is present, the speed control means 104 outputs the steady-state compensation torque τm, and hence the command torque given to the motor is a sum of the feed forward torque τff, the acceleration/deceleration torque τa, and the compensation torque τm. Accordingly, the precise maintenance of the tension as set by the feed forward torque τff is difficult.

In contrast, in the motor control apparatus according to the first embodiment of the present invention, the ratio calculation means 102 is provided. As represented in the following equation (5), based on the speed deviation ωe, the ratio calculation means 102 calculates, by calculation including at least integral calculation, the ratio gain α so that the speed deviation ωe asymptotically approaches zero. Then, the base speed ωb input from the outside is changed by using the ratio gain α, and accordingly, the ratio calculation means 102 generates the command speed ωr so that the command speed ωr has an appropriate speed difference from the base speed ωb.

$$\alpha = Kr \cdot \omega e/s \quad (5)$$

On this occasion, Kr is an integral gain for the ratio calculation.

The first embodiment is configured as described above, and hence even if the minute error of the conveyor roll diameter or the expansion/contraction of the material to be conveyed changes the conveying speed before and after the conveyor roll, which generates the steady-state speed deviation ωe, the ratio calculation means 102 adjusts the value of the ratio gain α, based on the speed deviation ωe. Then, the command speed calculation means 101 corrects, by using the ratio gain α, the base speed ωb so that the speed deviation ωe asymptotically approaches zero, thereby generating the command speed ωr. Accordingly, the speed deviation ωe can be minute (approximately zero). As a result, the compensation torque τm output by the speed control means 104 does not have a steady-state output, and the desired tension as set by the feed forward torque τff can be imparted to the material to be conveyed, resulting in highly precise tension control.

Moreover, according to the first embodiment, the ratio gain α is not adjusted directly based on the tension or the tension calculated value, and the ratio gain α is calculated based on the speed deviation ωe so that the speed deviation ωe asymptotically approaches zero. As a result, even if the material to be conveyed or the conveyor roll is changed, an appropriate ratio gain α can be automatically calculated. Thus, a tension as set by the feed forward torque τff can be always imparted to the material to be conveyed. Moreover, even if the conveying speed or the tension fluctuates due to influence of an unexpected external disturbance, the effect of the speed deviation correction means 105 can prevent the motor torque and the tension from generating an excessive error, and can prevent the conveyor system from becoming unstable. Based on the speed deviation ωe generated transiently, the ratio gain α is automatically calculated, which generates command speed ωr so that the speed deviation ωe asymptotically approaches zero, and consequently, a desired tension can be imparted steadily to the material to be conveyed.

Moreover, in the first embodiment, the acceleration/deceleration torque calculation means 106 and the command torque calculation means 107 are provided. The acceleration/deceleration torque calculation means 106 calculates the acceleration/deceleration torque τa required to drive the motor 1 and the mechanical load 2. The command torque calculation means 107 sums the acceleration/deceleration torque τa, the feed forward torque τff, and the compensation torque τm, thereby generating the command torque τr. As a result, while the motor 1 is precisely accelerated/decelerated, the torque generated by the motor 1 can be controlled steadily to coincide with the feed forward torque τff externally set, and the speed of the motor 1 can be stably operated. As a result, even during the acceleration/deceleration, the motor 1 can be stably operated while the tension imparted to the material to be conveyed, which is conveyed by the motor 1 and the mechanical load 2, is controlled to coincide with the value set externally.

Moreover, in the first embodiment, the description that the speed deviation correction means 105 carries out the proportional calculation using the proportional gain K is given. However, the configuration is not limited to this example, and the speed deviation correction means 105 may have any configuration as long as the steady-state gain is finite when s is set to 0 in the transfer function from the speed deviation $\omega e$ to the compensation torque $\tau m$. For example, there may be provided a configuration in which the speed deviation correction means 105 is omitted and a high-pass filter is serially added to the speed control means 104 for calculating the proportional-integral calculation. Alternatively, there may be provided a configuration in which the speed deviation correction means 105 is similarly omitted and, in place of the high-pass filter, control calculation in which the integral calculation of the speed control means 104 is replaced by pseudo integral calculation is carried out. In any case, the steady-state gain is finite when s is set to 0 in the transfer characteristic from the speed deviation $\omega e$ to the compensation torque $\tau m$, and the same effects as in the first embodiment described above are obtained.

Moreover, the description is given of the case where the ratio calculation means 102 according to the first embodiment calculates, based on the speed deviation $\omega e$, by the calculation including at least the integral calculation, the ratio gain $\alpha$ so that the speed deviation $\omega e$ asymptotically approaches zero. However, the ratio calculation means 102 may carry out proportional calculation or proportional-integral calculation which uses a proportional gain. Note that, in any case, even if the set tension, the conveyor roll, or the material to be conveyed is changed, the effect that the ratio gain can be calculated automatically is obtained. Further, when the ratio calculation means 102 calculates the ratio gain $\alpha$ by the proportional calculation based on the speed deviation $\omega e$, approximately the same effect as in the case of the integral calculation described above can be obtained, by increasing the proportional gain in a continuous or stepwise manner until the magnitude of the speed deviation $\omega e$ becomes smaller than a predetermined threshold.

Moreover, according to the first embodiment, the command torque calculation means 107 outputs the command torque $\tau r$ by at least adding the feed forward torque $\tau ff$ input externally and the compensation torque $\tau m$. Accordingly, the tension as set by the feed forward torque $\tau ff$ can thus be imparted to the material to be conveyed.

Moreover, in the first embodiment, the acceleration/deceleration torque calculation means 106 and the command torque calculation means 107 are provided. The acceleration/deceleration torque calculation means 106 receives, as the input, the command speed $\omega r$, and outputs the acceleration/deceleration torque $\tau a$ required for carrying out the acceleration/deceleration so that the motor speed $\omega m$ coincides with the command speed $\omega r$. The command torque calculation means 107 sums the compensation torque $\tau m$, the feed forward torque $\tau ff$, and the acceleration/deceleration torque $\tau a$, thereby outputting the command torque $\tau r$. As a result, even during the acceleration/deceleration, the motor 1 can be stably operated and hence it is possible to realize a precise acceleration/deceleration. Moreover, a transitional fluctuation resulting from a change in the acceleration/deceleration no longer appears in the speed deviation $\omega e$. As a result, the ratio calculation can be carried out precisely and at high speed. The motor control apparatus 100 according to the first embodiment is configured to include the acceleration/deceleration calculation means 106 inside the motor control apparatus 100 but there may be provided a configuration in which the acceleration/deceleration torque calculation means 106 may be omitted and, when the command speed is input, an acceleration/deceleration torque calculated in advance may be input from the outside.

Moreover, in the first embodiment, the description is given of the case where the transfer characteristic from the input to the output of the reference speed generation means 108 is 1, and thus $\omega a = \omega r$. For example, a fluctuation in tension caused by a discontinuous change at an inflection point of the command speed $\omega r$ can be suppressed by providing a configuration in which the reference speed generation means 108 calculates, by first-order lag calculation, the reference speed $\omega a$ so as to follow the command speed $\omega r$. Moreover, by equalizing responses of the first-order lag calculations by the reference speed generation means 108 in the motor control apparatus respectively driving the motor 21 and the motor 22 of FIG. 2, the speed aligning property of the motor speeds of the motor 21 and the motor 22 can be improved, resulting in precise tension control.

Second Embodiment

Figure 3:
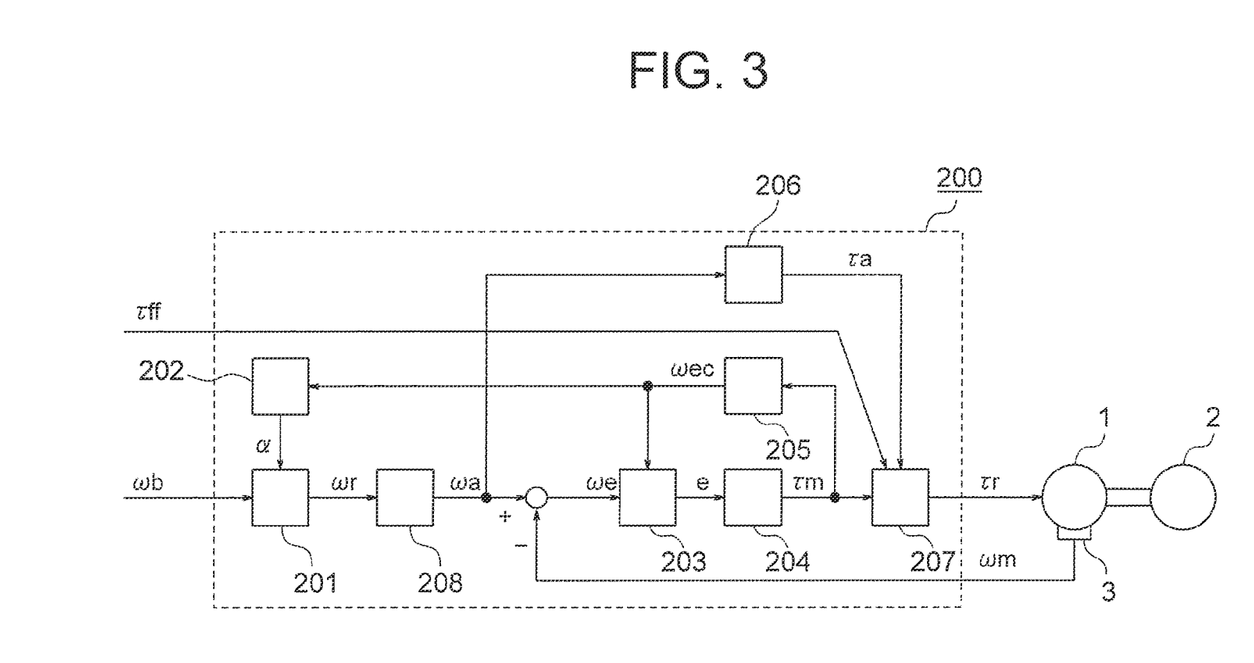
FIG. 3 A block diagram illustrating a configuration of a motor control apparatus according to a second embodiment of the present invention.

FIG. 3 is a block diagram illustrating a motor control apparatus according to a second embodiment of the present invention. In FIG. 3, reference numeral 200 denotes a motor control apparatus (equivalent to 100 of FIG. 1); 201, command speed calculation means (equivalent to 101 of FIG. 1); 202, ratio calculation means (equivalent to 102 of FIG. 1); 203, control deviation calculation means (equivalent to 103 of FIG. 1); 204, speed control means (equivalent to 104 of FIG. 1); 205, speed deviation correction means (equivalent to 105 of FIG. 1); 206, acceleration/deceleration torque calculation means (equivalent to 106 of FIG. 1); 207, command torque calculation means (equivalent to 107 of FIG. 1); and 208, reference speed generation means (equivalent to 108 of FIG. 1). Note that, reference numerals 1 to 3 are the same as those in FIG. 1, and, therefore, a description thereof is omitted. In the following, for simple description as in the first embodiment, a description is given by assuming that the transfer characteristic from the input to the output of the reference speed generation means 208 is 1 and $\omega a = \omega r$, and thus, $\omega a' = \omega r'$.

The configuration in FIG. 3 and the configuration in FIG. 1 are different in that, while the speed deviation $\omega e$ is input to the ratio calculation means 102 according to the first embodiment illustrated in FIG. 1, in this embodiment, in place of the speed difference $\omega e$, the speed deviation correction value $\omega ec$ output by the speed deviation correction means 205 is input to the ratio calculation means 202. The other configuration and operation are basically the same as those of the first embodiment. Therefore, for a description not provided in the following, refer to the first embodiment.

The motor control apparatus 200 receives, as inputs, a motor speed $\omega m$, which is a speed of the motor 1 detected by the speed detection means 3, a base speed $\omega b$ input from the outside, and a feed forward torque $\tau ff$, and the motor control apparatus 200 outputs the command torque $\tau r$ based on operation described in the following.

Inside the motor control apparatus 200, the command speed calculation means 201 receives, as inputs, the base speed $\omega b$ input from the outside, and a ratio gain $\alpha$ calculated by the ratio calculation means 202. The command speed calculation means 201 generates, by using the base speed $\omega b$ and the ratio gain $\alpha$, a command speed $\omega r$ for controlling the motor speed $\omega m$ of the motor 1. Specifically, the command speed calculation means 201 generates, by using the ratio gain $\alpha$, and by carrying out an arithmetic calculation represented, for example, by the equation (1), the command speed ωr so that the command ωr has a speed difference with respect to the base speed ωb.

The control deviation calculation means 203 receives, as an input, the speed deviation ωe, which is a difference between the command speed ωr (=the reference speed ωa) and the motor speed ωm. Further, to the control deviation calculation means 203, the speed deviation correction value ωec output by the speed deviation correction means 205 is also input. The control deviation calculation means 203 outputs the control deviation e by using the speed deviation ωe and the speed deviation correction value ωec, for example, based on calculation represented by the equation (2). The speed control means 204 receives, as an input, the control deviation e, and carries out calculation, for example, as represented by the equation (3), so as to reduce the control deviation e, by means of an proportional-integral calculation using a speed proportional gain Kvp and a speed integral gain Kvi, and outputs a result thereof as a compensation torque τm.

The compensation torque τm output by the speed control means 204 is input to the speed deviation correction means 205. The speed deviation correction means 205 outputs the speed deviation correction value ωec by applying predetermined control calculation based on the compensation torque τm. As an example of the predetermined control calculation, the compensation torque τm may be multiplied by a predetermined gain, and the multiplication result may be used as the speed deviation correction value ωec.

The acceleration/deceleration torque calculation means 206 receives, as an input, the command speed ωr (=reference speed ωa) output by the command speed calculation means 201. The acceleration/deceleration torque calculation means 206 calculates, according to a change in the command speed ωr, a torque required for accelerating/decelerating the motor 1 and the mechanical load 2 coupled to the motor 1, and outputs the torque as an acceleration/deceleration torque τa. The calculation of the acceleration/deceleration torque τa is carried out by a method of, for example, calculating a command acceleration ωr', which is a differentiated signal of the command speed ωr, and multiplying the calculated command acceleration ωr' by a moment of inertia of the motor 1 and a moment of inertia of the mechanical load 2.

The command torque calculation means 207 receives, as inputs, the feed forward torque τff input from the outside, the compensation torque τm output by the speed control means 204, and the acceleration/deceleration torque τa output by the acceleration/deceleration torque calculation means 206. The command torque calculation means 207 outputs, as the command torque τr, a sum of the input feed forward torque τff, the compensation torque τm, and the acceleration/deceleration torque τa.

The ratio calculation means 202 receives, as an input, the speed deviation correction value ωec output by the speed deviation correction means 205. The ratio calculation means 202 calculates the ratio gain α by applying such control calculation as to reduce the speed deviation correction value ωec. Further, the ratio calculation means 202 changes the base speed ωb, based on the ratio gain α, by the calculation represented by the equation (1), and outputs the command speed ωr.

On this occasion, assuming that the speed control means 204 carries out the proportional-integral calculation represented by the equation (3) using the speed proportional gain Kvp and the speed integral gain Kvi, and that the speed deviation correction means 205 carries out proportional calculation using the speed proportional gain Kvp, a transfer function from the speed deviation ωe to the speed deviation correction value ωec is represented by the following equation (6).

$$\omega ec/\omega e = (Kvp \cdot s + Kvi)K/\{(1+Kvp) \cdot s + K \cdot Kvi\} \quad (6)$$

In the equation (6), when s=0, a relationship ωec/ωe=1 holds true, and the speed deviation ωe and the speed deviation correction value ωec coincide with each other steadily.

The second embodiment is configured, as described above, so that, in place of the speed deviation ωe, the speed deviation correction value ωec is input to the ratio calculation means 202, and the ratio calculation means 202 calculates the ratio gain α, based on the speed deviation correction value ωec. Accordingly, the command speed calculation means 201 generates the command speed ωr. There are transient differences, but the second embodiment can provide the same effects as in the first embodiment.

Moreover, as long as a signal is equivalent to the speed deviation ωe, there may be provided a configuration in which, in place of the speed deviation ωe or the speed deviation correction value ωec, for example, the compensation torque τm output by the speed control means 204 is input to the ratio calculation means 202, and the ratio calculation means 202 calculates the ratio gain α based on the compensation torque τm.

Moreover, according to the second embodiment, the description is given of the case where the ratio calculation means 202 calculates, based on the speed deviation correction value ωec, by the calculation including at least the integral calculation, the ratio gain α so that the speed deviation correction value ωec asymptotically approaches zero. However, the ratio calculation means 202 may carry out proportional calculation or proportional-integral calculation which uses the ratio gain α. Note that, in any case, the effect that, even if the set tension, the conveyor roll, or the material to be conveyed is changed, the ratio gain α can be calculated automatically is obtained. Further, when the ratio calculation means 202 calculates the ratio gain α by means of the proportional calculation based on the speed deviation correction value ωec, approximately the same effect as in the case of the integral calculation described above can be obtained, by increasing the ratio gain α in a continuous or stepwise manner until the magnitude of the speed deviation correction value ωec becomes smaller than a predetermined threshold.

Third Embodiment

Figure 4:
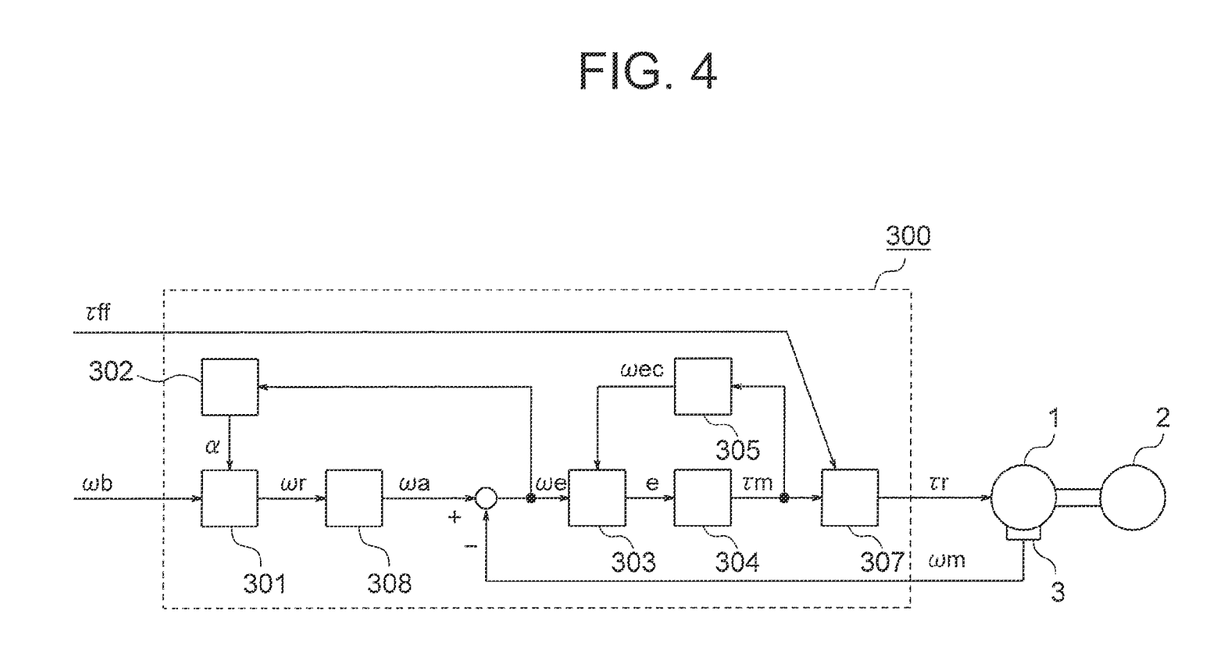
FIG. 4 A block diagram illustrating a configuration of a motor control apparatus according to a third embodiment of the present invention.

FIG. 4 is a block diagram illustrating a motor control apparatus according to a third embodiment of the present invention. In FIG. 4, reference numeral 300 denotes a motor control apparatus (equivalent to 100 of FIG. 1); 301, command speed calculation means (equivalent to 101 of FIG. 1); 302, ratio calculation means (equivalent to 102 of FIG. 1); 303, control deviation calculation means (equivalent to 103 of FIG. 1); 304, speed control means (equivalent to 104 of FIG. 1); 305, speed deviation correction means (equivalent to 105 of FIG. 1); 307, command torque calculation means (equivalent to 107 of FIG. 1); and 308, reference speed generation means (equivalent to 108 of FIG. 1). Note that, reference numerals 1 to 3 are the same as those in FIG. 1, and therefore, a description thereof is omitted. In the following, for simple description as in the first embodiment, a description is given by assuming that the transfer characteristic from the input to the output of the reference speed generation means 108 is 1 and ω=ωa.

The configuration in FIG. 4 and the configuration in FIG. 1 are different in that, according to this embodiment, the acceleration/deceleration torque calculation means 106 provided in the first embodiment in FIG. 1 is omitted, and in that the acceleration/deceleration torque $\tau a$ is not input to the command torque calculation means 307, but only the feed forward torque $\tau ff$, which is the input from the outside, and the compensation torque $\tau m$ output by the speed control means 304 are input to the command torque calculation means 307. The other configuration and operation are basically the same as those of the first embodiment. Therefore, for a description not provided in the following, refer to the first embodiment.

The motor control apparatus 300 receives, as inputs, a motor speed $\omega m$, which is detected by the speed detection means 3, a base speed $\omega b$ input from the outside, and a feed forward torque $\tau ff$, and outputs a command torque $\tau r$ by an operation described below.

Inside the motor control apparatus 300, the command speed calculation means 301 receives, as inputs, the base speed $\omega b$ input from the outside and a ratio gain $\alpha$ calculated by the ratio calculation means 302. The command speed calculation means 301 generates, by using the ratio gain $\alpha$, the command speed $\omega r$ for controlling the motor speed $\omega m$ of the motor 1. The motor 1 drives the mechanical load 2 based on the command speed $\omega r$. Specifically, the command speed calculation means 301 generates, by carrying out an arithmetic calculation represented, for example, by the equation (1), the command speed $\omega r$ so that the command $\omega r$ has a speed difference with respect to the base speed $\omega b$.

The control deviation calculation means 303 receives, as an input, the speed deviation $\omega e$, which is a difference between the command speed $\omega r$ and the motor speed $\omega m$. Further, to the control deviation calculation means 303, the speed deviation correction value $\omega ec$ output by the speed deviation correction means 305 described later is also input. The control deviation calculation means 303 outputs the control deviation e, by using the speed deviation $\omega e$ and the speed deviation correction value $\omega ec$, for example, based on calculation represented by the equation (2). The speed control means 304 receives, as an input, the control deviation e, and carries out calculation, for example, as represented by the equation (3), so as to reduce the control deviation e, by means of an proportional-integral calculation using a speed proportional gain Kvp and a speed integral gain Kvi, and outputs a result thereof as a compensation torque $\tau m$.

The speed deviation correction means 305 outputs the speed deviation correction value $\omega ec$, based on the compensation torque $\tau m$ output by the speed control means 304, by applying predetermined control calculation. As an example of the predetermined control calculation, the compensation torque $\tau m$ may be multiplied by a predetermined gain, and the multiplication result may be used as the speed deviation correction value $\omega ec$.

The command torque calculation means 307 receives, as inputs, the feed forward torque $\tau ff$ input from the outside and the compensation torque $\tau m$ output by the speed control means 304, and outputs, as the command torque $\tau r$, a sum of the feed forward torque $\tau ff$ and the compensation torque $\tau m$.

To the ratio calculation means 302, the speed deviation $\omega e$, which is a difference between the command speed $\omega r$ (=reference speed $\omega a$) and the motor speed $\omega m$, is input. The ratio calculation means 302 calculates the ratio gain $\alpha$, by applying such control calculation as to reduce the speed deviation $\omega e$. As a result, the command speed calculation means 301 changes the base speed $\omega b$, based on the ratio gain $\alpha$ calculated by the ratio calculation means 302, by the calculation represented by the equation (1), and outputs the command speed $\omega r$.

As described above, due to the minute error in the conveyor roll diameter and the expansion/contraction of the material to be conveyed, the conveying speed may change before and after the conveyor roll. Moreover, resulting from the change in the conveying speed, the speed deviation $\omega e$ may be generated. The third embodiment is configured as described above so that, even if the speed deviation $\omega e$ is generated, the ratio calculation means 302 acquires the ratio gain $\alpha$ for correcting the base speed $\omega b$ so that the speed deviation $\omega e$ asymptotically approaches zero. Accordingly, the command speed calculation means 301 corrects the base speed $\omega b$ by using the ratio gain $\alpha$, thereby generating the command speed $\omega r$, and hence the speed deviation $\omega e$ can be minute (approximately zero). As a result, the compensation torque $\tau m$ output by the speed control means 304 does not have a steady-state output, and the desired tension as set by the feed forward torque $\tau ff$ can be imparted to the material to be conveyed, resulting in highly precise tension control.

Moreover, according to the third embodiment of the present invention, the ratio calculation means 302 calculates, based on the speed deviation $\omega e$, the ratio gain $\alpha$ so that the speed deviation $\omega e$ asymptotically approaches zero. Accordingly, even if the material to be conveyed or the conveyor roll is changed, the ratio calculation means 302 automatically calculates the appropriate ratio gain $\alpha$, and hence the tension as set by the feed forward toque $\tau ff$ can always be imparted to the material to be conveyed. Moreover, even if the conveying speed or the tension is fluctuated by influence of unexpected external disturbances, the effect of the speed deviation correction means 305 prevents an excessive error in the motor torque and the tension from being generated, and prevents the conveyor system from becoming unstable. Based on the speed deviation $\omega e$ generated transiently, the ratio gain $\alpha$ is automatically calculated, and the command speed $\omega r$ is generated so that the speed deviation $\omega e$ asymptotically approaches zero. Consequently, a desired tension can be imparted steadily to the material to be conveyed.

Moreover, according to the third embodiment, as described in the second embodiment, in place of the speed deviation $\omega e$, the speed deviation correction value $\omega ec$ or the compensation torque $\tau m$ can be input to the ratio calculation means 302. In this case, the ratio calculation means 302 calculates the ratio gain $\alpha$ based on the speed deviation correction value $\omega ec$ or the compensation torque $\tau m$.

Note that, according to the third embodiment, the acceleration/deceleration torque $\tau a$ is not added to the command torque $\tau r$, which is different from the first embodiment. Accordingly, during the acceleration/deceleration, the command torque $\tau r$ and the feed forward torque $\tau ff$ do not coincide with each other, and the capability of the motor speed $\omega m$ to follow the command speed $\omega r$ is inferior compared to the first embodiment. However, in the third embodiment, the compensation torque $\tau m$ transiently decreases/increases based on the decrease/increase in the command speed $\omega r$, and hence the capability to follow the command speed $\omega r$ does not deteriorate extremely.

Moreover, according to the third embodiment, in the motor control apparatus 300, when the feed forward torque $\tau ff$ to be input from the outside is calculated, effects approximately the same as those of the first embodiment can be obtained by calculating the acceleration/deceleration torque required for accelerating/decelerating the motor 1 and the mechanical load 2, and further adding the calculating result to the feed forward torque $\tau ff$.

Moreover, according to the third embodiment, the description is given of the case where the ratio calculation means 302 calculates, based on the speed deviation $\omega e$, by the calculation including at least the integral calculation, the ratio gain α so that the speed deviation ωe asymptotically approaches zero. However, the ratio calculation means 302 may carry out proportional calculation or proportional-integral calculation which uses the ratio gain. Note that, in any case, the effect that, even if the set tension, the conveyor roll, or the material to be conveyed is changed, the ratio gain α can be calculated automatically is obtained. Further, when the ratio calculation means 302 calculates the ratio gain α by means of the proportional calculation based on the speed deviation ωe, approximately the same effect as in the case of the integral calculation described above can be obtained, by increasing the above-mentioned ratio gain α in a continuous or stepwise manner until the magnitude of the speed deviation ωe becomes smaller than a predetermined threshold.

Fourth Embodiment

Figure 5:
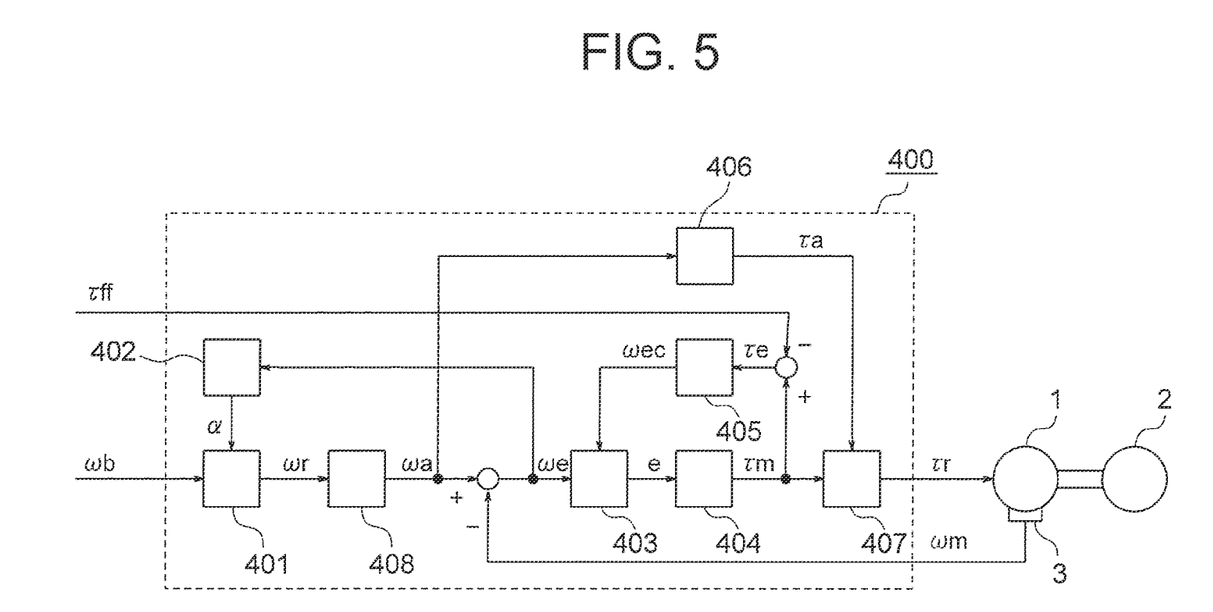
FIG. 5 A block diagram illustrating a configuration of a motor control apparatus according to a fourth embodiment of the present invention.

FIG. 5 is a block diagram illustrating a motor control apparatus according to a fourth embodiment of the present invention. In FIG. 5, reference numeral 400 denotes a motor control apparatus (equivalent to 100 of FIG. 1); 401, command speed calculation means (equivalent to 101 of FIG. 1); 402, ratio calculation means (equivalent to 102 of FIG. 1); 403, control deviation calculation means (equivalent to 103 of FIG. 1); 404, speed control means (equivalent to 104 of FIG. 1); 405, speed deviation correction means (equivalent to 105 of FIG. 1); 406, acceleration/deceleration torque calculation means (equivalent to 106 of FIG. 1); 407, command torque calculation means (equivalent to 107 of FIG. 1); and 408, reference speed generation means (equivalent to 108 of FIG. 1). Note that, reference numerals 1 to 3 are the same as those in FIG. 1, and therefore, a description thereof is omitted. In the following, for simple description as in the first embodiment, a description is given by assuming that the transfer characteristic from the input to the output of the reference speed generation means 408 is 1 and ωa=ωr, and thus, ωr'=ωa'.

The configuration in FIG. 5 and the configuration in FIG. 1 are different in that, according to this embodiment, the input of the feed forward torque τff to the command torque calculation means 407 is omitted. Moreover, as the input to the speed deviation correction means 405, in place of the compensation torque τm, a torque deviation τe, which is a deviation between the feed forward torque τff and the compensation torque τm, is used. The other configuration and operation are basically the same as those of the first embodiment, and, for a description not provided in the following, refer to the first embodiment.

The motor control apparatus 400 receives, as inputs, a motor speed ωm, a base speed ωb input from the outside, and a feed forward torque τff, and outputs a command torque τr by an operation described below.

Inside the motor control apparatus 400, the command speed calculation means 401 receives, as inputs, the base speed ωb input from the outside and the ratio gain α calculated by the ratio calculation means 402, and generates the command speed ωr for controlling the motor speed ωm of the motor 1 for driving the mechanical load 2. The command speed calculation means 401 generates, by using the ratio gain α, and by carrying out an arithmetic calculation represented, for example, by the equation (1), the command speed ωr so that the command ωr has a speed difference with respect to the base speed ωb.

To the control deviation calculation means 403, the speed deviation ωe, which is a difference between the command speed ωr (=reference speed ωa) and the motor speed ωm, is input. Moreover, to the control deviation calculation means 403, the speed deviation correction value ωec output by the speed deviation correction means 405 is also input. The control deviation calculation means 403 acquires the control deviation e based on the speed deviation ωe and the speed deviation correction value ωec. The speed control means 404 receives, as an input, the control deviation e, and carries out calculation, for example, as represented by the equation (2), so as to reduce the control deviation e, by means of the proportional-integral calculation using the speed proportional gain Kvp and the speed integral gain Kvi, and outputs a result thereof as a compensation torque τm.

The speed deviation correction means 405 receives, as an input, the torque deviation τe, which is a deviation between the feed forward torque τff and the compensation torque τm, and outputs the speed deviation correction value ωec by applying the predetermined control calculation. As an example of the predetermined control calculation, the compensation torque τm may be multiplied by a predetermined gain, and the multiplication result may be used as the speed deviation correction value ωec.

The acceleration/deceleration torque calculation means 406 receives, as an input, the command speed ωr (=reference speed ωa) output by the command speed calculation means 401, calculates, according to a change in the command speed ωr, a torque required for accelerating/decelerating the motor 1 and the mechanical load coupled to the motor 1, and outputs the torque as an acceleration/deceleration torque τa. The calculation of the acceleration/deceleration torque τa is carried out by a method of, for example, calculating a command acceleration ωr', which is a differentiated signal of the command speed ωr, and multiplying the calculated command acceleration ωr' by a moment of inertia of the motor 1 and a moment of inertia of the mechanical load 2.

The command torque calculation means 407 receives, as inputs, the compensation torque τm output by the speed control means 404 and the acceleration/deceleration torque τa output by the acceleration/deceleration torque calculation means 406, and outputs, as the command torque τr, a sum of the compensation torque τm and the acceleration/deceleration torque τa.

The ratio calculation means 402 receives, as an input, the speed deviation ωe, and calculates the ratio gain α by applying such control calculation as to reduce the speed deviation ωe. Accordingly, the command speed calculation means 401 changes the base speed ωb, based on the calculated ratio gain α, by the calculation represented by the equation (1), and outputs the command speed ωr.

According to the fourth embodiment, the configuration described above provides the same effects as in the first embodiment. Moreover, according to the fourth embodiment, the speed deviation correction means 405 receives, as an input, the difference τe between the feed forward torque τff and the compensation torque τm, and calculates the speed deviation correction value ωec. Accordingly, it is possible to stably control, by feeding back the torque, the tension imparted to the material to be conveyed, and to impart the tension as set by the feed forward torque to the material to be conveyed.

Moreover, according to the fourth embodiment, the description is given of the case where the ratio calculation means 402 calculates, based on the speed deviation ωe, by the calculation including at least the integral calculation, the ratio gain α so that the speed deviation ωe asymptotically approaches zero. However, the ratio calculation means 402 may carry out proportional calculation or proportional-integral calculation which uses the ratio gain. Note that, in any case, the effect that, even if the set tension, the conveyor roll, or the material to be conveyed is changed, the ratio gain can be calculated automatically is obtained. Further, when the ratio calculation means 402 calculates the ratio gain α by means of the proportional calculation based on the speed deviation ωe, approximately the same effect as in the case of the integral calculation described above can be obtained, by increasing the ratio gain in a continuous or stepwise manner until the magnitude of the speed deviation ωe becomes smaller than a predetermined threshold.

REFERENCE SIGNS LIST 1 motor; 2 mechanical load; 3 speed detection means; 100, 200, 300, 400 motor control apparatus; 101, 201, 301, 401 command speed calculation means; 102, 202, 302, 402 ratio calculation means; 103, 203, 303, 403 control deviation calculation means; 104, 204, 304, 404 speed control means; 105, 205, 305, 405 speed deviation correction means; 106, 206, 406 acceleration/deceleration torque calculation means; 107, 207, 307, 407 command torque calculation means; 108, 208, 308, 408 reference speed generation means.

The invention claimed is:

1. A motor control apparatus, comprising:
   command speed calculation means for calculating a command speed based on a base speed input from an outside and a ratio gain;
   compensation torque calculation means having a transfer characteristic from a speed deviation to a compensation torque, which is a limited steady-state gain characteristic, for outputting the compensation torque based on the speed deviation by means of control computation without integral calculation, the speed deviation being a difference between the command speed and a motor speed, which is a speed of a motor for driving a mechanical load;
   command torque calculation means for outputting, based on at least the compensation torque, a command torque, which is a target value of a torque of the motor for driving the mechanical load; and
   ratio calculation means for calculating the ratio gain based on the speed deviation and inputting the ratio gain to the command speed calculation means.

2. A motor control apparatus according to claim 1, wherein the ratio calculation means calculates the ratio gain by means of control calculation including at least integral calculation so that the speed deviation decreases.

3. A motor control apparatus according to claim 1, wherein the ratio calculation means calculates the ratio gain by means of proportional calculation using a predetermined gain so that the speed deviation decreases.

4. A motor control apparatus according to claim 1, wherein the ratio calculation means increases the ratio gain until the speed deviation becomes less than a predetermined threshold.

5. A motor control apparatus according to claim 1, wherein the command torque calculation means calculates the command torque by adding a feed forward torque input from the outside and the compensation torque.

6. A motor control apparatus according to claim 1, further comprising acceleration/deceleration torque calculation means for receiving, as an input, the command speed, and outputting an acceleration/deceleration torque required for carrying out acceleration/deceleration so that the motor speed coincides with the command speed,
   wherein the command torque calculation means calculates the command torque by summing the compensation torque, a feed forward torque input from the outside, and the acceleration/deceleration torque.

7. A motor control apparatus according to claim 6, wherein the speed deviation is a difference between a reference speed, which is calculated based on the command speed output by the command speed calculation means, and the motor speed, and the acceleration/deceleration torque calculation means receives, as an input, the reference speed, and outputs an acceleration/deceleration torque required for carrying out acceleration/deceleration so that the motor speed coincides with the reference speed.

8. A motor control apparatus according to claim 1, wherein the compensation torque calculation means comprises:
   control deviation calculation means for outputting a control deviation based on the speed deviation and a speed deviation correction value;
   speed control means for outputting, based on the control deviation, by means of control calculation including at least integral calculation, a compensation torque so that the control deviation decreases; and
   speed deviation correction means for calculating the speed deviation correction value based on at least the compensation torque and inputting the speed deviation correction value to the control deviation calculation means.

9. A motor control apparatus according to claim 8, wherein the speed deviation correction means receives, as an input, a difference between a feed forward torque input from the outside and the compensation torque, and calculates the speed deviation correction value based thereon.

* * * * *